United States Patent
Lapere et al.

(12) 
(10) Patent No.: US 6,347,604 B1
(45) Date of Patent: Feb. 19, 2002

(54) METHOD AND A DEVICE FOR MOVING CHICKENS OR OTHER POULTRY

(75) Inventors: Geert Lodewijk Lapere; Frank Raymond Lapere; Bart Paul Lapere; Jan Robert Lapere, all of Rumbeke/Roeselare (BE)

(73) Assignee: Lacosin N.V. (NL)

(*) Notice: Subject to any disclaimer, the term of this patent is extended or adjusted under 35 U.S.C. 154(b) by 0 days.

(21) Appl. No.: 09/445,678

(22) PCT Filed: Jun. 8, 1998

(86) PCT No.: PCT/EP98/03660

§ 371 Date: Mar. 6, 2000

§ 102(e) Date: Mar. 6, 2000

(87) PCT Pub. No.: WO98/56245

PCT Pub. Date: Dec. 17, 1998

(30) Foreign Application Priority Data

Jun. 11, 1997 (NL) .............................................. 1006278

(51) Int. Cl.[7] .......................... A01K 29/00; B65G 11/00
(52) U.S. Cl. ........................................ 119/843; 119/845
(58) Field of Search ................................. 119/843, 844, 119/845, 847, 848; 414/393, 401; 296/24.2

(56) References Cited

U.S. PATENT DOCUMENTS

| | | | | |
|---|---|---|---|---|
| 2,675,783 A | * | 4/1954 | Sears | 119/845 |
| 2,840,041 A | * | 6/1958 | Fleming | 119/845 |
| 4,301,769 A | * | 11/1981 | Mola | 119/844 |
| 4,307,683 A | * | 12/1981 | Parker, Jr. | 119/843 |
| 4,365,591 A | * | 12/1982 | Wills et al. | 119/843 |
| 4,736,710 A | * | 4/1988 | Nicolai | 119/844 |
| 5,259,811 A | * | 11/1993 | Berry | 119/847 |
| 5,983,837 A | * | 11/1999 | Briggs et al. | 119/845 |
| 6,109,215 A | * | 8/2000 | Jerome | 119/843 |

* cited by examiner

Primary Examiner—Charles T. Jordan
Assistant Examiner—Elizabeth Shaw
(74) Attorney, Agent, or Firm—Moser, Patterson & Sheridan, L.L.P.

(57) ABSTRACT

A method for moving chickens or other poultry, wherein the chickens are moved upwards from the floor (3) by means of a conveyor (4), to a level on which the bottom of a collecting space (5) is positioned. A vehicle, in which the conveyor (4) and the collecting space (5) are mounted, is thereby driven through a poultry house. Several collecting spaces (5, 9, 10) are disposed one above the other, and the collecting spaces are moved in vertical direction in such a manner that various collecting spaces can successively be positioned in relationship with the sloping surface (4). The chickens are led from said collecting spaces (5) into transport spaces (17)), which are mounted on a lorry. From said transport spaces the chickens are led into accommodation spaces (22), which form part of a slaughterhouse.

17 Claims, 5 Drawing Sheets

METHOD AND A DEVICE FOR MOVING CHICKENS OR OTHER POULTRY

The invention relates to a method for moving chickens or other poultry. The term chickens used hereinafter is understood to include other animals which can be handled in a similar manner, in particular other poultry.

Chickens which are intended for slaughter live in a poultry house for six weeks, for example, which poultry house accommodates 20 chickens per square meter, for example. Poultry houses may have an area of more than 1000 $m^2$ to 1500 $m^2$. When the chickens are to be transported to the slaughterhouse, they must first be collected in the poultry house. It is usual thereby to place the chickens into crates by hand, after which the plastic crates are transported to the slaughterhouse on lorries. This is a very labour-intensive activity, which requires a lot of personnel. Consequently, the collecting of chickens in the poultry house can only take place when such personnel is available, and in many cases this is not the most favourable moment. As a result of that, the chickens often remain relatively long in the crates, which is not conducive to their health.

The object of the invention is to provide a method for collecting and transporting chickens, which requires relatively few personnel, which can be carried out quickly and efficiently, which ensures the well-being of the chickens and which is furthermore animal-friendly.

In order to accomplish that objective, the chickens are according to the invention moved upwards from the floor of the poultry house by means of a conveyor which slopes upwards from the floor on which the chickens are present, to a level at which the bottom of a collecting space is positioned. The chickens are preferably moved by moving a conveyor, in the form of a carrier on which the chickens are present, in one plane.

By moving the chickens upwards to the level at which the bottom of a collecting space is positioned, the chickens can be led into said collecting space without any personnel being required thereby. Preferably the number of chickens that are moved into the collecting space on the conveyor is detected, so that it can be determined how many chickens are present in said collecting space.

In one preferred embodiment, the conveyor and the collecting space are present on a vehicle, which can be driven through the poultry house so as to lead the chickens onto the conveyor. The vehicle may be provided with a seat for the driver.

The chickens in the collecting space are preferably moved by means of a conveyor, which in substance forms the bottom of the collecting space. The speed at which said conveyor moves may be lower than the speed at which the sloping conveyor moves, preferably said speed is controlled in dependence on the number of chickens that are detected to be present on said sloping conveyor. This makes it possible to ensure that the collecting space is filled properly, independently of the number of chickens which are present on the conveyor that moves the chickens obliquely upwards.

In one preferred embodiment several collecting spaces, preferably more than two, preferably four, are disposed one above the other, and the collecting spaces can be moved in vertical direction, in such a manner that several collecting spaces can successively be positioned in adjoining relationship with the sloping surface. In this manner the various collecting spaces can be successively filled with chickens, so that relatively many chickens can be collected in the vehicle. Preferably, the collecting space can be opened on one side so as to allow the chickens to enter, and subsequently it can be opened on the opposite side so as to allow the chickens to leave again, whereby the conveyor that substantially forms the bottom of the collecting space is moved in both cases. In practice it has become apparent that the chickens hardly move with respect to the conveyor, so that a small extra movement of the conveyor ensures that all chickens will be moved to a sufficient degree, for example outside the collecting space. The chickens are moved from said collecting space into a transport space, which transport space is provided with a bottom which is substantially made up of a conveyor, which is moved in the same direction as the conveyor of the collecting space, whereby the bottom of the collecting space has been positioned on substantially the same level as the bottom of the transport space. The conveyors thereby move over a distance which substantially corresponds with the length of the collecting space, measured in the direction of movement of the conveyors. The transport space may have a length which is a multiple of the collecting space, preferably a quadruple thereof, so that the transport space can be filled by moving a load of chickens from the collecting space into the transport space four times.

It is possible thereby to connect several collecting spaces disposed one above the other simultaneously to the same number, preferably more than two, for example four, of transport spaces disposed one above the other. Thus, four collecting spaces disposed one above the other can for example be connected to four transport spaces disposed one above the other, which transport spaces are for example provided in a wagon, such as a lorry, a semitrailer or a trailer. If the lorry thereby comprises eight transport spaces disposed one above the other, the vehicle comprising the four collecting spaces can fill the eight transport spaces in the lorry in two goes. If the length of the transport space is four times that of the collecting space, eight vehicle loads will be required to fill all transport spaces completely with chickens.

The transport means in the transport spaces can preferably move in two directions, so as to make it possible to load as well as unload the chickens on the rear side of the wagon.

In one preferred embodiment the transport spaces in the wagon are provided with a watering installation, so that the chickens can drink during transport, for example from a plurality of nipple drinkers which are fitted on watering pipes in the transport spaces in several places. This means a considerable improvement of the well-being of the chickens during transport in comparison with transport in crates, whereby it is not possible to feed the animals.

Preferably the wagon is unloaded by reversing the wagon to a position near an accommodation space for the chickens, whose bottom in substance consists of a conveyor, which bottom is positioned on substantially the same level as the bottom of a transport space, from which the chickens are moved into the accommodation space by moving the conveyors of both spaces in the same direction. It is thereby preferred to move chickens simultaneously from several transport spaces disposed one above the other into the same number of accommodation spaces disposed one above the other. Also the accommodation spaces are preferably fitted with a watering installation, so that the chickens can drink from a large number of nipple drinkers which are distributed over the accommodation space.

In addition, a sprinkler may be provided in the wagon comprising the collecting spaces, in the transport spaces as well as in the accommodation spaces, so that said spaces can be easily cleaned when chickens have been present in said spaces. Preferably a receptacle is present under said spaces, in which receptacle the cleaning fluid can be collected.

Preferably a number of accommodation spaces are jointly housed in a building, in which an acclimatisation installation can control an optimum environment for the chickens.

Preferably an accommodation space is opened on one side so as to allow the chickens to enter, and subsequently it is opened on the opposite side so as to allow the chickens to leave again, whereby the conveyor, which substantially forms the bottom of the collecting space, is moved in both cases. The chickens are moved from the accommodation space onto a conveyor, which is positioned on substantially the same level as the conveyor in the accommodation space, and which is moved in a direction substantially transversely to the direction in which the conveyor in the accommodation space is moved. The transverse conveyor can thereby pass a number of accommodation spaces, from where chickens can be moved onto said conveyor. It is also possible to move chickens from accommodation spaces located on different levels, by means of conveyors, to a level from where they are transported further, which level is preferably located at the level of the bottom of the lowermost accommodation space.

Preferably a conveyor is provided with a carrier, which moves in a flat plane, and on which the chickens are present. Said carrier is preferably provided with interconnected grate bars arranged in side-by-side relationship, which are moved in their transverse direction. The spaces between said grate bars are preferably selected to be so narrow that the chickens can readily find support on said grate bars with their feet. The bars may be provided with a plastic covering.

Since the carrier is made up of grate bars arranged in side-by-side relationship, the construction is sufficiently open, on the one hand to enable easy cleaning and on the other to see therethrough. In addition, this is important with a view to supplying fresh air for the chickens and discharging the manures from the chickens, which manure can fall through the bars.

The invention furthermore relates to a device for moving chickens or other poultry, which device comprises a sloping conveyor, which extends between the floor on which the chickens are present to a level at which the bottom of a collecting space is positioned. The conveyor preferably has a width of more than 2 m, and in a preferred embodiment it has a width of more than 2.5 m. This makes it possible to move the conveyor over a relative large floor area of the poultry house.

Preferably detection means are present for determining the number of chickens that are present on the conveyor. Said means may for example consist of a row of ultrasonic telemeters, which row extends transversely to the direction of movement of the conveyor. This makes it possible to determine the dimension of that part of the conveyor on which chickens are present, so that it can thus be calculated how many chickens have been transported.

Preferably the bottom area of the collecting space is more than 4 $m^2$, more preferably 8 $m^2$, and in a prefer-red embodiment it is more than 12 $m^2$.

The various spaces may be provided with closable openings through which chickens can pass, which openings extend to the bottom of the space in question and which are provided with a pivoted door, whose hinge is positioned near the bottom of the space in question. This makes it possible to pivot the door of a space open until it rests on the conveyor which forms the bottom of an adjacent space, whereby the chickens are transported to said adjacent space.

Further aspects of the invention, which may be used either separately or in combination with each other, are described with reference to the figures and defined in the claims.

In order to provide a better understanding of the invention, an embodiment of the method for moving chickens will be described below with reference to the figures.

Figure 1:
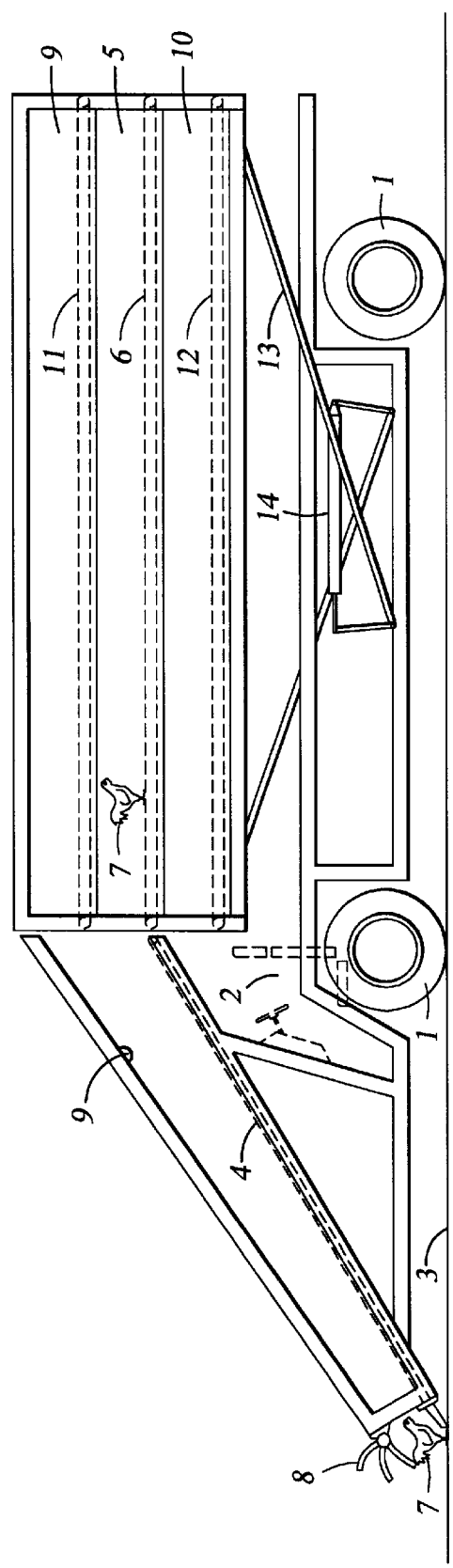
FIG. 1 shows a wagon comprising collecting spaces.

FIG. 1 shows a vehicle comprising wheels 1 and a seat 2 for a driver, which vehicle can be driven across the floor 3 of a poultry house. On its front side the vehicle is provided with an endless conveyor 4, which is inclined to the horizontal, and which forms a carrier on the upper side, which moves from the floor 3 of the poultry house to the bottom of a collecting space 5, which bottom is made up of an endless conveyor 6, which forms a substantially horizontally extending carrier for chickens 7. Seat 2 for the driver may also be provided at a higher position, for example completely or partially above conveyor 4, so that the driver will have a good view of the vehicle and the area around it.

Further guide elements 8 may be present on the front side of conveyor 4, where the chickens 7 are to be moved onto conveyor 4, which guide elements function to guide the chickens onto conveyor 4. It will be apparent that when the vehicle drives in forward direction, the chickens which are present in front of the vehicle will land on conveyor 4 practically automatically.

A detector 9 detects the number of chickens being moved by means of conveyor 4, which detector consists of a number of ultrasonic telemeters, which are mounted transversely to the direction of movement of conveyor 4, and which are capable of detecting whether chickens are present at the location of a plane which extends transversely to the direction of movement. In this manner it is possible to determine the extent of the area of conveyor 4 on which the chickens are present, from which it can be derived how many chickens pass detection means 9 and land into collecting space 5. The speed of conveyor 6 of collecting space 5 is adapted to the number of chickens being carried, so that collecting space 5 can be filled optimally.

According to FIG. 1, the vehicle comprises three collecting spaces 5, 9, 10 disposed one above the other, which are all provided with a conveyor 6, 11 and 12 respectively, collecting spaces 5, 9, 10 can be moved in vertical direction by means of a scissor-like lifting element 13, which is operated by means of a hydraulic cylinder 14. Collecting spaces 5, 9, 10 can be successively filled with chickens by correctly positioning the bottoms of said collecting spaces.

Collecting spaces 5, 9, 10 are provided with closable openings on their sides, the left-hand side and the right-hand side in FIG. 1. When the collecting spaces are being filled with chickens, the opening of the respective collecting space on the left-hand side (FIG. 1) is opened temporarily, and conveyor 6, 11, 12 of the respective collecting space 5, 9, 10 is moved to the right, usually at a speed which is lower than the speed at which conveyor 4 moves, depending on the number of chickens that are present on conveyor 4.

Figure 2:
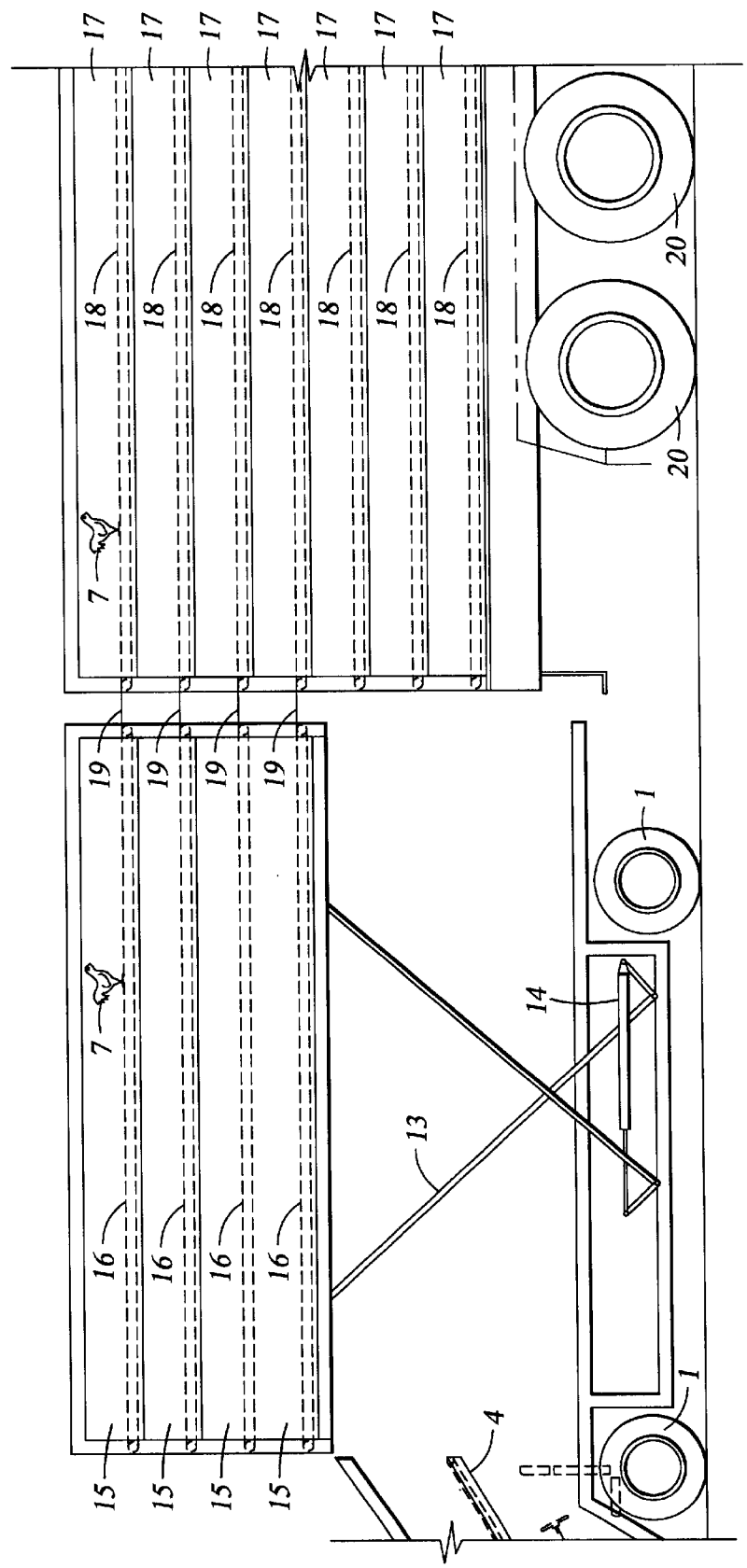
FIG. 2 shows collecting spaces with transport spaces connected thereto.

FIG. 2 shows a part of a vehicle for collecting chickens, which vehicle is provided with four collecting spaces 15 disposed one above the other, which collecting spaces are each provided with a conveyor 16, which forms the bottom of the collecting spaces 15 in question. Lifting element 13 has moved collecting spaces 15 to a level where said collecting spaces adjoin the four uppermost transport spaces 17 of a lorry, which transport spaces 17 are each provided with a conveyor 18, which forms the bottom of the transport space 17 in question. The doors 19, which are capable of closing the sides of collecting spaces 15 and/or transport spaces 17, also form the connection between the collecting space and the adjacent transport space, over which the chickens can be moved. During said movement the conveyors 16 and 18 will move at substantially the same speed and in the same direction, to the right in FIG. 2.

The transport spaces 18 are disposed one above the other in a lorry (only partially shown in FIG. 2), the wheels 20 of which can be distinguished in FIG. 2. The lorry which is shown in FIG. 2 comprises seven transport spaces disposed one above the other, in practice, however, this number will preferably be eight, so that, once the four upper transport spaces have been filled, as shown in FIG. 2, the lower four transport spaces can subsequently be filled in a corresponding manner. Preferably, however, the lorry comprises eight transport spaces disposed one above the other, so that a vehicle comprising four collecting spaces disposed one above the other can twice be positioned to adjoin the various transport spaces 17 of the lorry.

The length of transport spaces 17 may be a multiple of the length of the collecting spaces, so that a collecting space can unload its load of chickens into the same transport space 17 several times.

Figure 3:
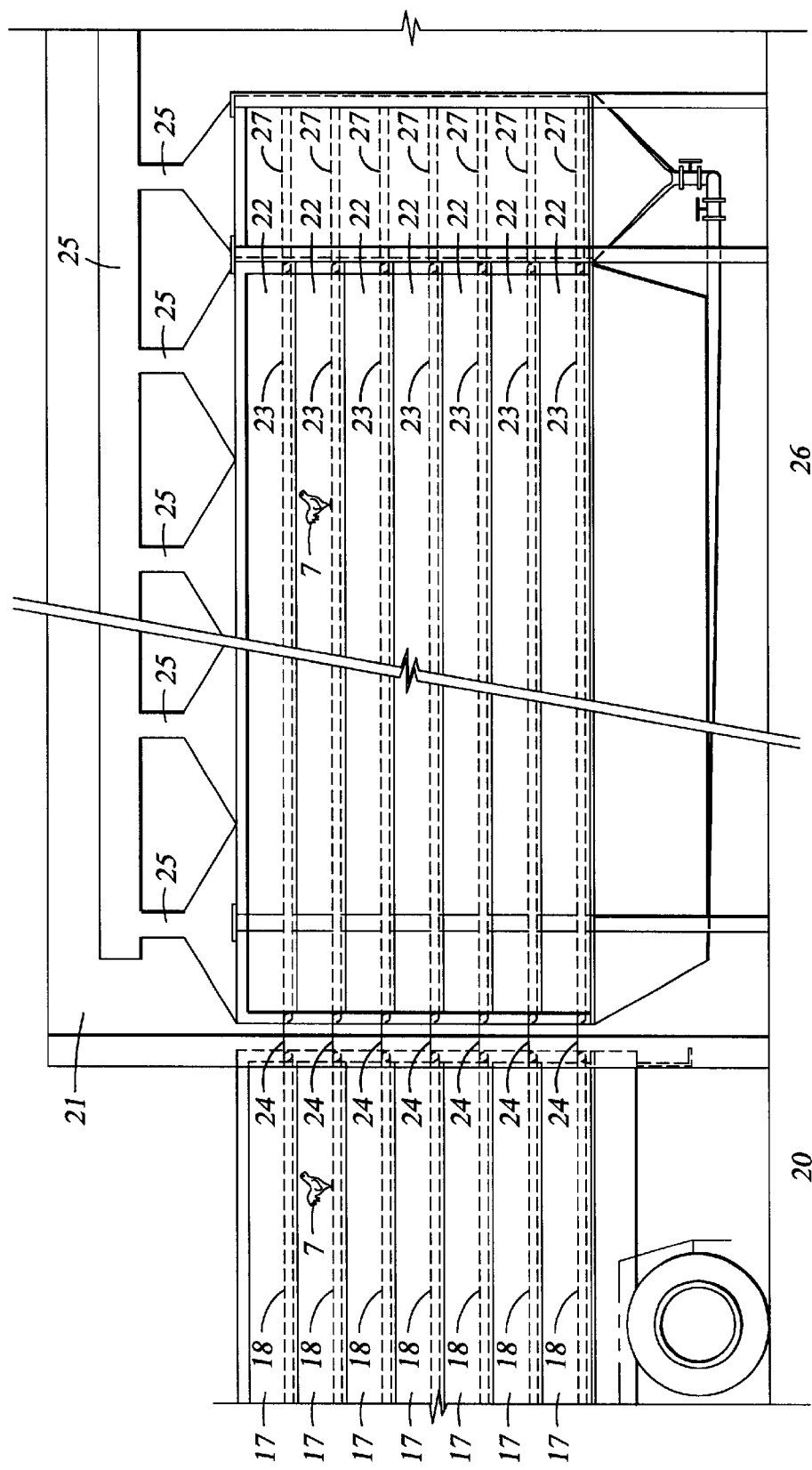
FIG. 3 shows transport spaces with accommodation spaces connected thereto.

Like FIG. 2, FIG. 3 shows the rear side of a lorry comprising transport spaces 17, which are provided with conveyors 18. The lorry has been reversed against a building 21, which houses a number of accommodation spaces 22, which are each provided with a conveyor 23 Seven accommodation spaces 22 are disposed one above the other, as many as the number of transport spaces 17 that are disposed one above the other in the lorry. After the doors 24 of the transport spaces 17 and/or of the accommodation spaces 22 have been pivoted downwards, the chickens 7 can be moved from transport spaces 17 to accommodation spaces 22. When chickens are unloaded from the transport spaces, the conveyor 17 moves in a direction opposite the direction in which it moves when transport spaces 17 are being loaded. Like transport spaces 17, accommodation spaces 22 may be provided with a sprinkler for cleaning the spaces, and with a watering installation comprising a large number of nipple drinkers, from which the chickens can drink. This is conducive to the well-being of the chickens, and it prolongs the period of time during which chickens cant stay in the space in question. The sprinkler and the watering installation are not shown in the figures for that matter.

It is possible to control the climate in the building 21 in which the accommodation spaces 22 are present, which considerably prolongs the period of time during which chickens can stay in the accommodation spaces. Since the capacity of building 21 is relatively small in comparison with the number of chickens accommodated in accommodation spaces 22, and since the access openings can be connected to the rear side of the lorry in a draught-free manner, the interior of the building 21 can be climatised in an efficient manner. Suction pipes 25 are provided above the accommodation spaces 22 for this purpose, so that the air surrounding the chickens can be sucked out so as to be conditioned or be exhausted at a suitable place.

A receptacle 26 is provided under accommodation spaces 22, which receptacle is capable of collecting and discharging the waste from the chickens, and which is also capable of collecting and discharging the cleaning fluid when the accommodation spaces are being cleaned.

The chickens can be discharged from the accommodation spaces 22 because a conveyor 27 connects to each conveyor 23, which conveyor 27 moves in a direction transversely to conveyor 23. The doors 28, which extend above conveyor 27, are temporarily opened thereby.

Figure 4:
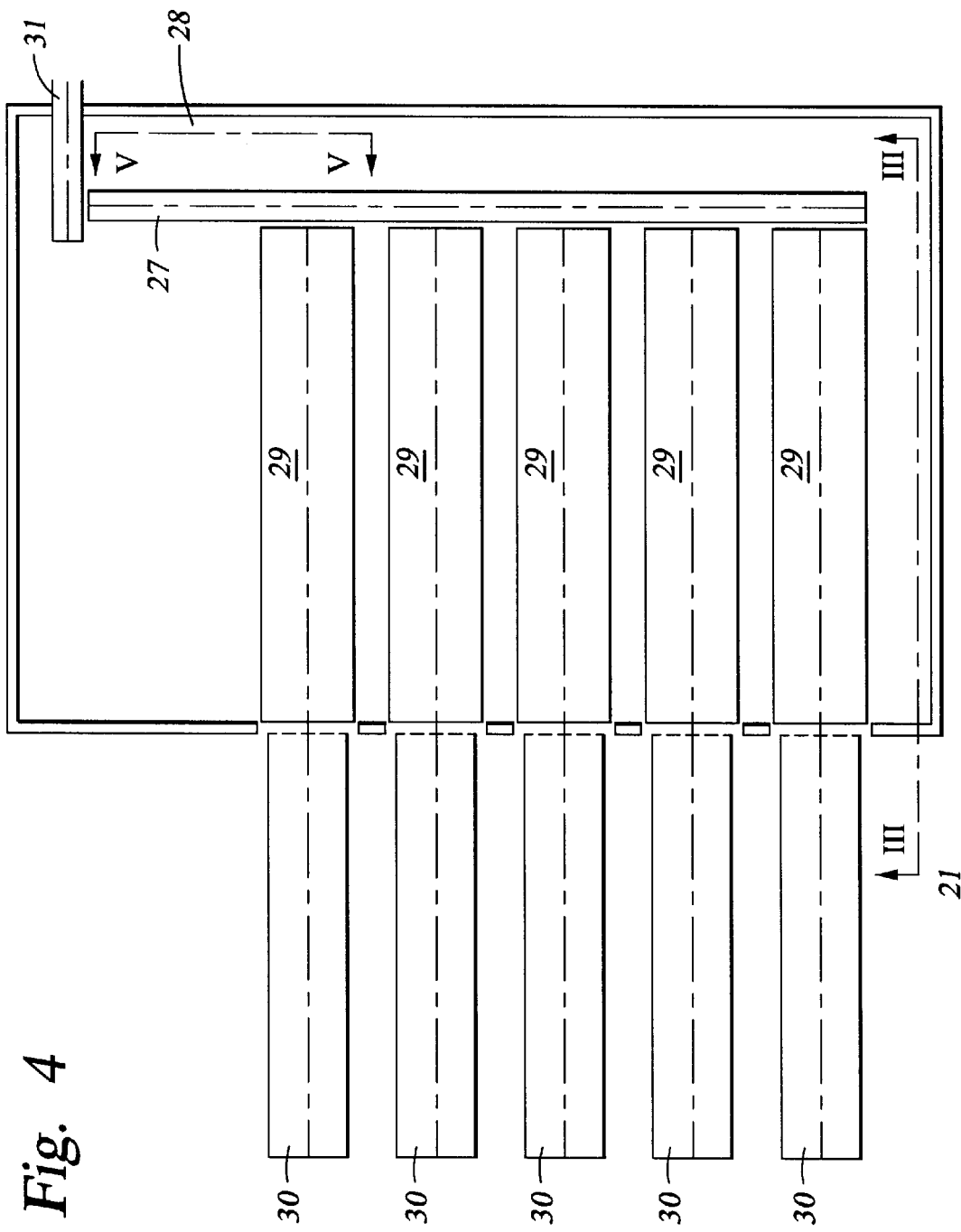
FIG. 4 is a plan view of a wagon comprising transport spaces, which are connected to accommodation spaces.

FIG. 4 is a plan view of the building 21, in which a large number of accommodation spaces are present, whereby each rectangle 29 represents a number of accommodation spaces disposed one above the other. Rectangles 30 represent lorries, in which a number of transport spaces disposed one above the other are present. Said transport spaces adjoin the accommodation spaces in building 21. As is apparent from FIG. 4, the dimension of an accommodation space is slightly larger than that of a transport space, so that it will be easier to move the chickens from the transport space to the accommodation space and so that the chickens will have sufficient space to stay in the accommodation spaces for a longer period of time.

FIG. 4 diagrammatically shows conveyor 27 for discharging the chickens from the accommodation spaces, as well as a conveyor 31, which transports the chickens from building 21 to a slaughterhouse.

Figure 5:
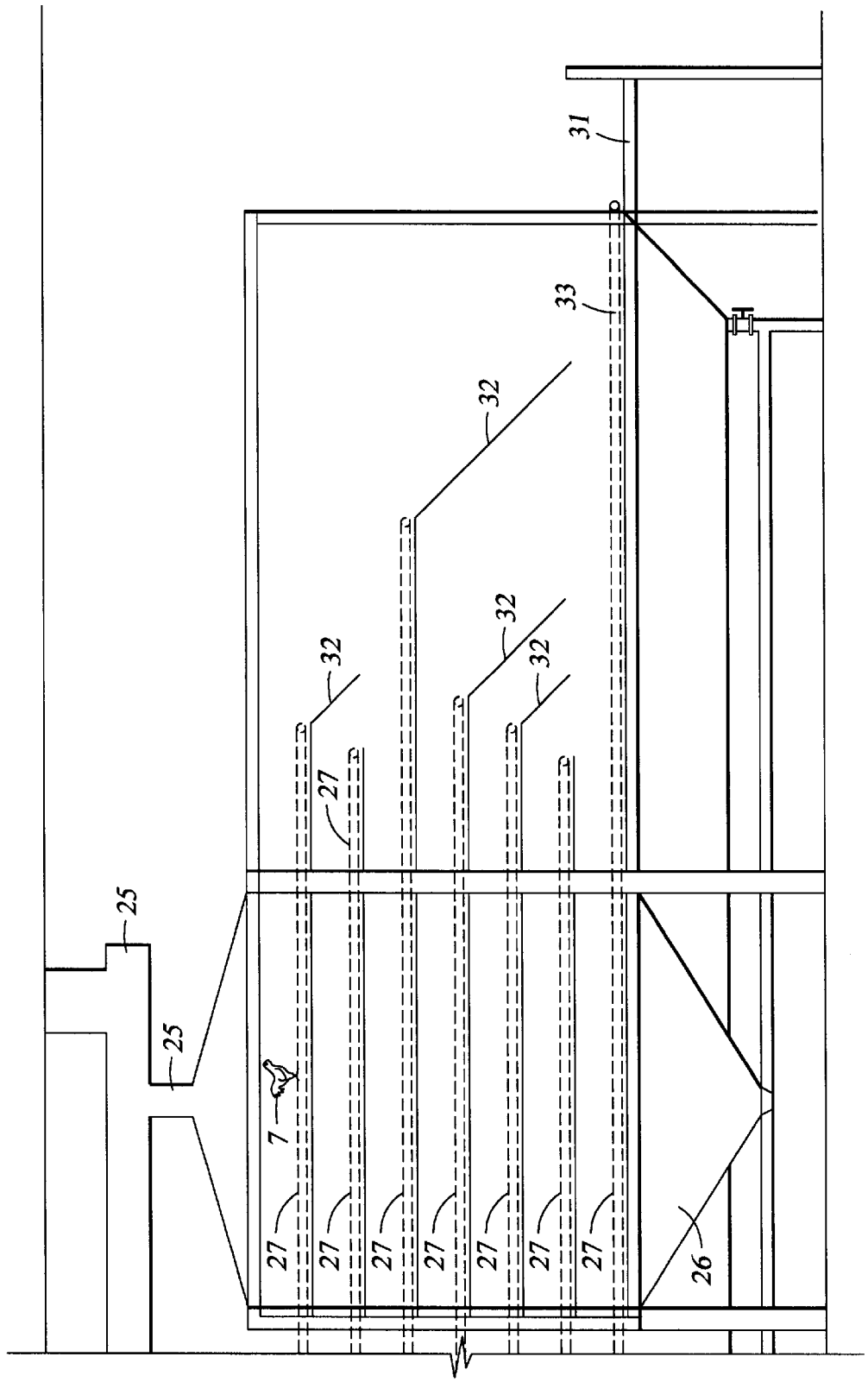
FIG. 5 shows the manner in which chickens are discharged from the accommodation spaces. The figures are merely diagrammatic illustrations of the embodiment, wherein like parts are numbered alike.

FIG. 5 is a view according to line V—V in FIG. 4. From the figure it is apparent that the conveyors 27 have different lengths, and that a number of said conveyors are provided with a chute 32 at their end, so that the chickens 7 which are present on the various conveyors 27 will eventually land on the same level, which is indicated at 33. Then they will land on conveyor 31, which discharges the chickens from building 21 to a slaughterhouse.

The illustrated embodiment for collecting and moving the chickens is to be considered merely as an example, a great many other embodiments are possible within the scope of the invention.

What is claimed is:

1. An apparatus for collecting and transporting poultry from a floor of a poultry house, the apparatus comprising:
   a movable vehicle;
   a first conveyor attached to the movable vehicle and having an upwardly sloping conveyor surface, the conveyor surface having a receiving end and an output end, the receiving end being positioned proximate the floor;
   at least one collection space positioned proximate the output end of the first conveyor; and
   a detection device positioned proximate the first conveyor, the detection device being configured to count a plurality of poultry passing by a specific point on the first conveyor.

2. The apparatus of claim 1, wherein the at least one collection space further comprises a plurality of collection spaces positioned one on top of the other in a stack configuration, each of the plurality of collection spaces having a floor portion.

3. The apparatus of claim 2, wherein the plurality of collection spaces are selectively movable in a vertical direction so that each of the respective floor portions may be individually aligned with the output end.

4. The apparatus of claim 2, wherein the floor portion further comprises a second conveyor.

5. The apparatus of claim 4, further comprising a controller in communication with the first conveyor, the detection device, and the second conveyor for controlling the speed at which the first and second conveyors operate based upon a number of poultry counted by the detection device.

6. The apparatus of claim 1, wherein the detection device further comprises a row of ultrasonic telemeters positioned above the first conveyor transversely to a direction of movement of the conveyor.

7. The apparatus of claim 6, wherein the row of ultrasonic telemeters is configured to determine an extent of an area of the first conveyor that is covered by poultry passing thereunder in order to determine how may poultry are present under the row of ultrasonic telemeters.

8. The apparatus of claim 1, wherein the at least one collection space further comprises a first end positioned proximate the output end of the first conveyor and a second end positioned opposite the first end, both the first and second ends having a selectively closable opening for allowing poultry to pass therethrough.

9. The apparatus of claim 1, wherein the width of the first conveyor is at least 2 meters.

10. The apparatus of claim 1, wherein a floor area of the at least one collection space is at least 4 square meters.

11. A method for collecting and transporting poultry from a poultry house floor, comprising:

collecting poultry on the floor of the poultry house with a receiving end of a first conveyor attached to a movable vehicle, the first conveyor having a conveyor surface that slopes upwardly from the receiving end and terminates in an output end;

counting the number of poultry passing by a predetermined plane crossing the first conveyor with a detection device, the detection device being configured to count multiple poultry crossing the plane simultaneously;

depositing the poultry in at least one collection space positioned proximate the output end of the first conveyor.

12. The method of claim 11, wherein counting the number of poultry passing by a predetermined plane further comprises counting the number of poultry crossing a predetermined plane using a row of ultrasonic telemeters positioned above the first conveyor transversely to a direction of movement of the conveyor.

13. The method of claim 11, wherein depositing the poultry in at least one collection space further comprises:

controlling a rate of travel for the first conveyor with a controller;

controlling a rate of travel of s second conveyor position on a floor portion of the at least one collection space, wherein the rate of travel for the first and second conveyors is controlled in accordance with the number of poultry counted.

14. The method of claim 13, wherein the rate of travel of the second conveyor is lower than the rate of travel of the first conveyor.

15. The method of claim 11, wherein depositing the poultry in at least one collection space further comprises depositing poultry in one of a plurality of collection spaces, the collection spaces being positioned one on top of another in a stack configuration.

16. The method of claim 15, wherein depositing poultry in one of the plurality of collection spaces further comprises selecting a specific collection space and elevating the specific collection space to be positioned proximate the output end of the first conveyor.

17. The method of claim 15, wherein each of the plurality of collection spaces further comprises a first end positioned proximate the output end of the first conveyor and a second end positioned opposite the first end, each of the first and second ends having a selectively opened door.

* * * * *